US007051193B2

(12) United States Patent
Wang et al.

(10) Patent No.: US 7,051,193 B2
(45) Date of Patent: May 23, 2006

(54) REGISTER ROTATION PREDICTION AND PRECOMPUTATION

(75) Inventors: Hong Wang, Fremont, CA (US); Christopher J. Hughes, Urbana, IL (US); Ralph Kling, Sunnyvale, CA (US); Yong-Fong Lee, San Jose, CA (US); Daniel M. Lavery, Santa Clara, CA (US); John Shen, San Jose, CA (US); Jamison Collins, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 607 days.

(21) Appl. No.: 09/819,339

(22) Filed: Mar. 28, 2001

(65) Prior Publication Data

US 2002/0144098 A1    Oct. 3, 2002

(51) Int. Cl.
*G06F 9/38* (2006.01)
(52) U.S. Cl. ...................................... 712/221; 712/219
(58) Field of Classification Search ................ 712/221, 712/238, 239, 200, 219, 227; 711/118, 213
See application file for complete search history.

(56) References Cited

U.S. PATENT DOCUMENTS

| | | | | |
|---|---|---|---|---|
| 4,342,084 A | * | 7/1982 | Sager et al. .................... 714/42 |
| 5,142,634 A | * | 8/1992 | Fite et al. ..................... 712/240 |
| 5,224,210 A | * | 6/1993 | Pinedo et al. ................. 345/501 |
| 6,151,671 A | * | 11/2000 | D'Sa et al. ................... 712/239 |
| 6,339,822 B1 | * | 1/2002 | Miller ........................ 712/213 |
| 6,351,805 B1 | * | 2/2002 | Janik et al. .................. 712/219 |
| 6,357,016 B1 | * | 3/2002 | Rodgers et al. ............. 713/601 |

OTHER PUBLICATIONS

Aiken, A., et al., "Optimal Loop Parallelization", *SIGPLAN Notices*, vol. 23 (7), ACM Press, 308-317, (Jul. 1988).
Dehnert, J.C., et al., "Overlapped Loop Support in the Cydra 5", *ASPLOS-III Proceedings Third Internation Conference on Architectural Support for Programming Languages and Operating Systemts*, 26-38, (Apr. 1989).
Ebcioglu, K., "A Compilation Technique for Softawre Pipelining of Loops with Conditional Jumps (Preliminary Version)", *Proceedings of the 20th Annual Workshop on Microprogramming and Microarcitechture*, 69-79, (Dec. 1987).

(Continued)

*Primary Examiner*—Henry W. H. Tsai
(74) *Attorney, Agent, or Firm*—Schwegman, Lundberg, Woessner & Kluth, P.A.

(57) ABSTRACT

Instruction-level parallelism in software pipelined loops is exploited by predicting future register rotations. A processor includes an architected current frame marker register and at least one unarchitected frame marker register. Register rotation prediction is achieved by setting the register rotation of future iterations of a software loop to be a function of the unarchitected frame marker registers. True data dependencies remain, but the dependencies caused solely by register renaming are removed. Dynamic predication is used to predicate instructions from future iterations, allowing them to be squashed if dependencies are later found. The register renaming that results from the prediction can be included in instructions in a buffer, or a renaming stage in an execution pipeline can perform the renaming.

34 Claims, 4 Drawing Sheets

OTHER PUBLICATIONS

Rau, B.R., "Iterative Modulo Scheduling", *International Journal of Parallel Programming* 24 (1), 3-64, (Feb. 1996).

Rau, B.R., et al., "Code Generation Schema for Modulo Scheduled Loops", *SIG MICRO Newsletter* 23 (1) (2), 158-159, (Dec. 1992).

Rau, B.R., et al., "Some Scheduling Techniques and an Easily Schedulable Horizontal Architechture for High Performance Scientific Computing", *14th Annual Microprogramming Workshop*, 183-198, (Oct. 1981).

* cited by examiner

Fig. 1

```
for (i=0; i<n; i++)
    y[i] = x[i] + 1;
```

*Fig. 2A*

```
// Initialization
    mov pr.rot  = 0           // Clear all rotating predicate registers
    cmp.eq p16,p0 = r0,r0     // Set p16=1
    mov ar.lc = 4             // Set loop counter to n-1
    mov ar.ec = 3             // Set epilog counter to 3

// loop
loop:
    (p16) ldl r32 = [r12],1   // Stage 1:  load x
    (p17) add r34 = 1,r33     // Stage 2:  y=x+1
    (p18) stl [r13] = r35,1   // Stage 3:  store y
    br.ctop.sptk.few loop     // Branch back
```

*Fig. 2B*

```
// loop
loop:
      ⎧ (p16) ldl  r32 = [r12],1      // Stage 1:  load x
  310 ⎨ (p17) add  r34 = 1,r33        // Stage 2:  y=x+1
      ⎩ (p18) stl  [r13] = r35,1      // Stage 3:  store y // loop
      ⎧ (p63) ldl  r127 = [r12],1     // Stage 1:  load x
  320 ⎨ (p16) add  r33  = 1,r32       // Stage 2:  y=x+1
      ⎩ (p17) stl  [r13] = r34,1      // Stage 3:  store y // loop
      ⎧ (p62) ldl  r126 = [r12],1     // Stage 1:  load x
  330 ⎨ (p63) add  r32  = 1,r127      // Stage 2:  y=x+1
      ⎩ (p16) stl  [r13] = r33,1      // Stage 3:  store y // loop
      ⎧ (p61) ldl  r125 = [r12],1     // Stage 1:  load x
  340 ⎨ (p62) add  r31  = 1,r126      // Stage 2:  y=x+1
      ⎩ (p63) stl  [r13] = r32,1      // Stage 3:  store y
```

REGISTER ROTATION PREDICTION AND PRECOMPUTATION

FIELD

The present invention relates generally to processors, and more specifically to processors with hardware support for software pipelined loops.

BACKGROUND

Many processors today employ multiple functional units to execute instructions in parallel. By executing instructions in parallel, the performance of the processor increases. When executing instructions in parallel, instructions are generally scheduled to take advantage of instruction-level parallelism (ILP). ILP is a term used to describe instructions that are not dependent on one another, such that they can be executed in parallel without sacrificing the correctness of the program. A discussion of ILP can be found in David A. Patterson & John L. Hennessy, "Computer Architecture: A Quantitative Approach," 220–370 (Morgan Kaufmann Publishers, 2d ed. 1996).

One mechanism to take advantage of parallelism available among instructions is to exploit parallelism among iterations of a loop. Depending on the relationship between instructions in the loop, instances of instructions from different iterations of the loop can be executed simultaneously without violating dependencies. "Software pipelining" is a term used to describe the concept of simultaneously issuing instructions from multiple iterations of a loop.

"Register assignment," also referred to as "register renaming," is a process used to map virtual (or logical) registers to physical registers. Register renaming can create data dependencies that arise in software pipelined loops. Because common registers are used from one loop iteration to the next, data dependencies generally exist between the loop iterations. Software pipelining techniques must be mindful of register-assignment-created data dependencies so as not to violate them.

Some processor designs help to alleviate the problem of dependencies created from register renaming by using "register rotation." Register rotation is a mechanism that reassigns registers for each iteration of the software pipelined loop so that dependencies caused solely by register renaming are removed. Between each iteration of the software pipelined loop, register assignments are offset by one, so that each iteration uses different physical registers. Register rotation is described in: Intel IA-64 Architecture Software Developer's Manual, Volume 1: IA-64 Application Architecture (Rev. 1.1 July 2000), <ftp://download.intel.com/design/IA-64/Downloads/24531702s.pdf>.

Processor vendors are constantly striving to find more mechanisms to exploit instruction-level parallelism. As the number of functional units in processors continue to increase, issuing more instructions to the various functional units simultaneously will become even more important than it is today.

For the reasons stated above, and for other reasons stated below which will become apparent to those skilled in the art upon reading and understanding the present specification, there is a need in the art for alternate methods and apparatus to perform or accelerate software pipelining.

DESCRIPTION OF EMBODIMENTS

In the following detailed description of the embodiments, reference is made to the accompanying drawings which show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide a mechanism to exploit instruction-level parallelism in software pipelined loops by predicting and precomputing future register rotations. The register renaming induced dependence from one iteration to the next is removed. True data dependencies remain, but the dependencies caused solely by the register renaming are removed. Dynamic predication can be used to predicate instructions from future iterations, allowing them to be speculatively executed together with instructions from the current iteration, and to be squashed if true dependencies are later found. Instructions corresponding to future iterations can be held in a special instruction buffer, where the register renaming induced dependency can be removed through prediction and precomputation of register rotations. At the issue stage of the pipeline, independent instructions from both the current iteration and the special instruction buffer (corresponding to future iterations) can be dispatched for execution. The register renaming that results from the prediction and precomputation can be included in the instructions in the buffer, or a renaming stage in an execution pipeline can perform the renaming.

Figure 1:
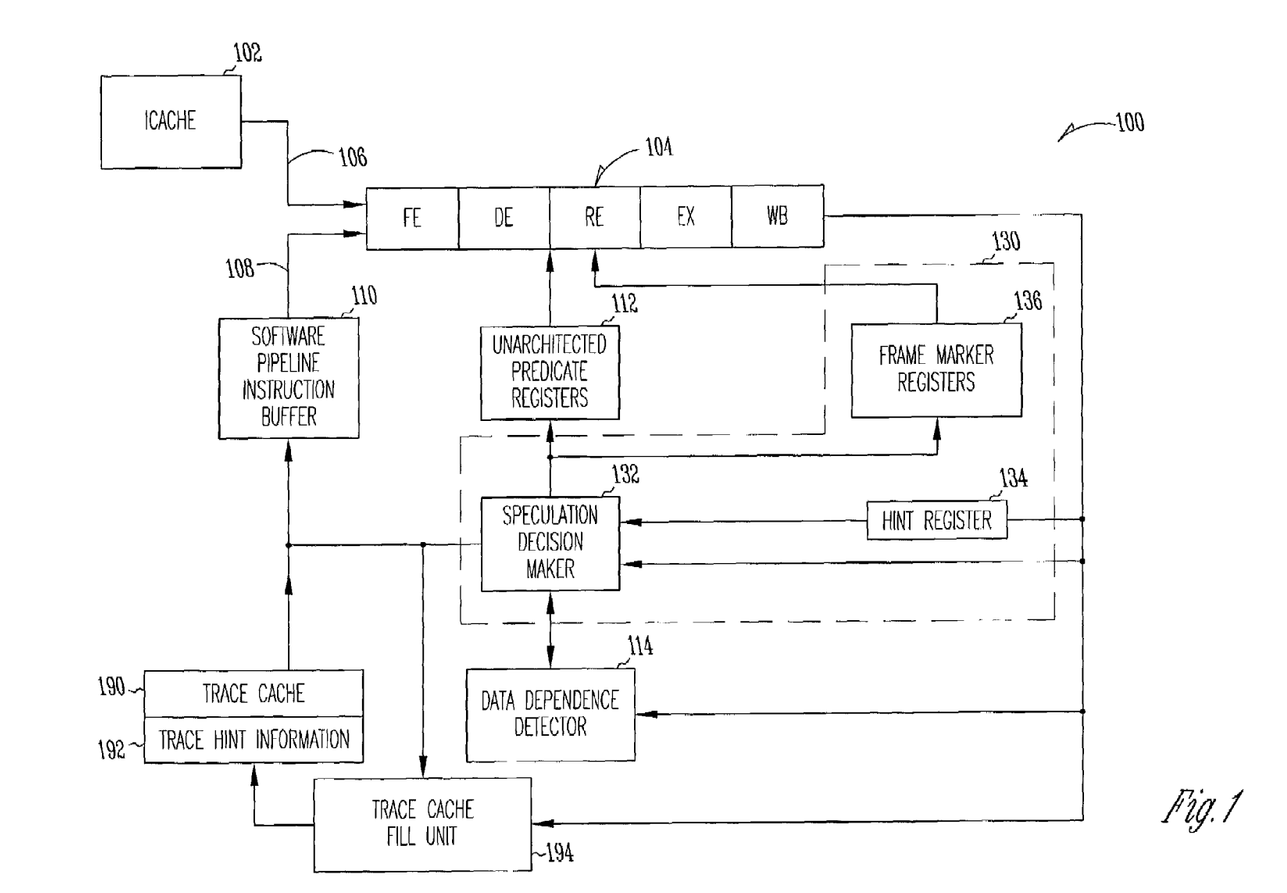
FIG. 1 shows a processor.

FIG. 1 shows a processor. Processor 100 includes pipeline 104, instruction cache 102, software pipeline instruction buffer 110, data dependence detector 114, and register rotation prediction unit 130. Register rotation prediction unit 130 includes speculation decision maker 132, hint register 134, and frame marker registers 136.

Pipeline 104 receives instructions from instruction cache 102 on node 106. Pipeline 104 also can receive instructions from software pipeline instruction buffer 110 on node 108. Pipeline 104 includes a fetch stage "FE," a decode stage "DE," a renaming stage "RE," an execution stage "EX," and a write back stage "WB." These stages are shown as exemplary pipeline stages. In some embodiments more stages exist, and in other embodiments fewer stages exist. Software pipeline instruction buffer 110 is shown as an exemplary unit. In some embodiments, software pipeline instruction buffer 110 is realized together with a trace cache which includes instruction traces generated from dynamically unrolled loop iterations.

Processor 100 includes architectural and microarchitectural structures to implement register rotation and register rotation prediction and precomputation. For example, an architectural frame marker register, also referred to as the "current frame marker" (CFM) register, is modified by certain instructions in order to dynamically rename the general purpose, floating point, and predicate registers to effect register rotation. Also for example, microarchitectural frame marker registers are included to predict and precompute future register rotations. Both architectural and microarchitectural frame marker registers are included within frame marker registers 136. The renaming stage within pipeline 104 can selectively utilize any of frame marker registers 136 to rename registers within instructions.

As used herein, the terms "architectural" and "architected" refer to structures that are visible to a programmer, whereas the terms "microarchitectural," "microarchitected," and "unarchitected" refer to structures that are not visible to a programmer. For example, the architected CFM register referred to above is visible, while the unarchitected frame marker registers are not.

Speculation decision maker 132 determines whether to speculatively execute instructions from future loop iterations. When a future loop iteration is to be speculatively executed, speculation decision maker 132 deposits instructions from future iterations into software pipeline instruction buffer 110. Speculation decision maker 132 also predicts and precomputes register rotations for future iterations and modifies values within frame marker registers 136 accordingly. The loop instructions from future iterations held within software pipeline instruction buffer 110 are generally predicated using unarchitected predicate registers 112, and have register rotations specified by unarchitected frame marker registers within frame marker registers 136.

Dynamic predication can be realized differently on different types of microarchitectures. For example, on a processor with an in-order pipeline, each instruction can, by default, have at least one architectural predicate register as an operand. For these processors, dynamic predication can be realized by associating an unarchitected or implementation specific predicate operand, in the form of register or immediate or register indirect, with the instructions in the loop of interest. The unarchitected predicate register is then evaluated based on the condition for the iteration of interest.

Also for example, on a processor with an out-of-order pipeline, dynamic predication can be used to associate a "branch color" with instructions in the loop of interest. The branch color indicates a particular instance of control speculation on a particular loop iteration. Resolution of the condition for the iteration determines whether a particular branch color is valid in program order.

In both in-order and out-of-order implementations, speculatively executed instructions from future loop iterations can be stored in buffers from which an instruction is picked out in program order for retirement or squash based on the resolved "dynamic predicate," whether it is realized as an unarchitected predicate operand or a branch color. Instructions with a predicate value of "true" or valid branch color are retired in program order while other instructions are squashed via flushing or draining out of the pipeline. The success of speculation depends on verification of data dependencies between dynamic instructions from two loop iterations. The details of dependency checking and approaches to handle misspeculation are discussed further below.

In some embodiments, it is possible to fetch multiple basic blocks simultaneously, such as when trace cache 190 is included within processor 100. An example trace cache is described in U.S. Pat. No. 5,381,533, issued Jan. 10, 1995 to Peleg, et al. entitled "Dynamic Flow Instruction Cache Memory Organized Around Trace Segments Independent Of Virtual Address Line." The Peleg example notwithstanding, the term "trace cache," as used herein, refers to any fetch structure that enables multiple basic blocks to be fetched in a single cycle. Because each trace cache entry provides information about the predicted future execution path, each trace cache entry can be augmented with trace hint information 192. For example, the execution path followed may influence whether rotation prediction should be performed or not, such as when two consecutive loop iterations are independent only when a certain condition is false. This information provides a value associated with each trace. Data dependence detector 114 is used to determine when the hint entry of a particular trace should be updated.

In some embodiments, each trace within trace cache 190 includes multiple loop iterations, and trace cache fill unit 194 applies rotation prediction offline to a trace as it is constructed. When employing such an optimization, registers within the trace are renamed to eliminate the CFM dependence, and the CFM value is modified before instructions following the trace are fetched. Rotation prediction can be used to predict a new CFM value that possibly differs from the actual value by more than one. If such an optimization is not employed with a trace cache, multiple CFM values can be predicted to rename all instructions within a trace. In some embodiments, hints are used to indicate that rotation prediction is to be applied to only a subset of the instructions within a trace.

Instructions held within software pipeline instruction buffer 110 are speculatively executed under the assumption that no true dependencies exist. If true dependencies are found, the execution of instructions from future iterations are squashed. Data dependence detector 114 determines if data dependencies exist between current iterations and future iterations. When data dependencies are found, speculation decision maker 132 appropriately clears one or more of unarchitected predicate registers 112 to squash the corresponding instructions from future iterations.

Predicating potentially all future loop iteration instructions allows processor 100 to issue as many instructions as it physically can without breaking any true data dependencies. Data dependence detector 114 can be placed off the critical path of pipeline 104 and can ran independently from the instruction execution.

In processors with register rotation but without register rotation prediction, an artificial data dependence can be created by the architected CFM register. Branch instructions used in software pipelined loops rotate the register stack by modifying the architected CFM register, thereby automatically renaming the general purpose, floating point, and predicate registers. The new value of the architected CFM register is used in the next loop iteration to obtain logical-to-physical register mappings, and therefore the instructions from one iteration have a data dependence upon the branch instruction from the previous iteration due to the architected CFM register. Because of this "CFM dependence," instructions from the beginning of the next iteration may not be issued in the same cycle as the branch instruction.

In some embodiments, the compiler provides "stop bits" in the bundle to signal to processor 100 of a potential dependence between instructions before and after a stop bit. In the case of modulo-scheduled loop branch instructions, the bundle has a stop-bit set because of the CFM dependence. In some embodiments, processor 100 speculatively removes the stop bit, thereby allowing instructions before and after the stop bit to be scheduled simultaneously. Removing future iterations' data dependence on branch instructions allows instructions from future iterations to be issued earlier than they otherwise would, including simultaneously with the branch instructions themselves. However, the CFM dependence may not be the only data dependence between loop iterations.

In some embodiments, the compiler does not communicate to processor 100 the reason that the stop bit was set. If the CFM dependence was the sole reason for setting the stop bit, register rotation prediction removes the CFM dependence, and ILP across loop iterations is effectively exploited. If the CFM dependence was not the sole reason for setting stop bit, data dependence detector 114 causes the appropriate future instructions to be squashed after they are issued.

In some embodiments, loop branch instructions held within software pipeline instruction buffer 110 have all stop bits removed. When processor 100 speculates, it executes loop instructions from software pipeline instruction buffer 110. Otherwise, it fetches them from instruction cache 102. Software pipeline instruction buffer 110 can be relatively small since most software pipelined loops are usually rather tight.

In embodiments described thus far, instructions from future loop iterations have logical register references that are mapped to physical register names by the renaming stage of pipeline 104. In other embodiments, instructions from future loop iterations have fully specified physical register names included within software pipeline instruction buffer 110. In these embodiments, unarchitected frame marker registers are not used because the register rotation prediction information is fully specified in the instructions themselves. In these embodiments, the renaming stage in pipeline 104 differentiates between instructions received from instruction cache 102 and software pipeline instruction buffer 110. Instructions from instruction cache 102 are assigned physical register addresses using the architected CFM register, and register references within instructions from software pipeline instruction buffer 110 are left unchanged.

Processor 100 also includes hint register 134. Hint register 134 is used to hold information useful to speculation decision maker 132. Hint register 134 can hold statically generated compiler hints or hints dynamically created by processor 100. For example, the compiler can generate hints specifying aggressive speculation, and if a large number of speculatively executed instructions are squashed, processor 100 can modify the contents of hint register 134 to reduce the aggressiveness with which speculation is employed. For convenience, FIG. 1 shows hint register 134 as a single register. In some embodiments, hint register 134 is a set of registers, rather than a single register. When hint register 134 is referred to in the remainder of this description, it is to be understood that additional embodiments exist that include multiple hint registers 134.

The compiler can perform static data dependence analysis in order to find instructions that are definitely independent. Typical compilers are generally conservative to guarantee correctness, and an instruction with even the potential of being dependent on another instruction is treated as if the dependence existed. In some embodiments of the present invention the compiler can perform this same analysis on consecutive loop iterations of modulo-scheduled loops, but instead of providing an absolute answer as to whether the iterations are dependent or independent, the compiler can decide how likely it is that consecutive iterations will be independent, aside from CFM dependence. If the probability of independence is high enough, the compiler can provide a hint to the hardware using hint register 134. The hint can direct processor 100 to aggressively and speculatively explore the dynamic data independence across loop iterations.

If the compiler detects through its analysis that the presence of independence can be determined from a relatively simple condition through computation, then the compiler can also generate instructions to dynamically perform such computation and communicate the determination on independence to the hardware via the hint registers. Hint register 134 can be used for this purpose. The compiler can insert code into the program that updates hint register 134 dynamically. The register is updated to reflect the compiler's estimate regarding independence of the next loop iteration from the current iteration. This is useful when the compiler can detect conditions under which loop iterations are independent and easily compute them dynamically. "Hint-operation" instructions to update hint register 134 can take the form of any operand mode that exists in the underlying architecture. For example, hint register 134 can be modified with hint-operation instructions having a "hint immediate" or "hint register indirect" operand. In some embodiments, hint-operation instructions are architecturally visible, and in other embodiments, hint-operation instructions are not architecturally visible.

Speculation decision maker 132 reads hint register 134 and uses it as a dynamic compiler hint as an alternative to a static hint embedded in the program itself. Hint register 134 allows more aggressive speculation for modulo-scheduled loops because the compiler can adapt its estimate to the behavior of the loop rather than generating a single conservative guess as to whether loop iterations are independent. Correct program execution is completely independent of the contents or validity of hint register 134. A bad hint may trigger more or less speculation than is optimum, but a bad hint will not affect correctness.

In some embodiments, hint register 134 includes a field that specifies the iteration distance between consecutive iterations that are independent. For example, if the compiler is able to detect that every other iteration is independent from a previous iteration, then it can communicate this to the processor via hint register 134. Instead of generating a single bit hint, the compiler can provide a limit on the number of iterations that the processor should speculatively execute. This limit can be placed into hint register 134. This further increases the accuracy of speculation, which decreases the penalty from mis-speculation and increases the benefit from correct speculation.

In some embodiments, data dependence detector 114 dynamically predicts when speculation should occur. In these embodiments, data dependence detector 114 looks for data dependencies between instructions from consecutive iterations when a modulo-scheduled loop is entered. If no such dependencies are found within the first few iterations, then speculation is be turned on.

In some embodiments, instructions are grouped into instruction groups that are an aggregate of mutually independent instructions. In these embodiments, data dependence detector 114 does not check dependencies between instructions from the same instruction group. Instead, data dependence detector 114 only needs to detect dependencies between the last instruction group of the current iteration and instructions of later instruction groups to the next stop that has not been speculatively removed by the processor. In other embodiments, the aggregate of instructions in an instruction group are not necessarily mutually independent.

In these embodiments, data dependence detector 114 checks dependencies between instructions from the same instruction group as well as between the last instruction group of the current iteration and instructions of later instruction groups.

In some embodiments, compiler hints are used to determine whether speculation is initially turned on. In these embodiments, data dependence detector 114 tracks the fraction of iterations that have inter-iteration dependencies. If speculation is off and only a small fraction of iterations have dependencies, then the compiler's estimate is overridden and speculation is activated. Alternatively, when speculation is on and too many mis-speculations occur, then speculation can be turned off. This speculation throttling mechanism provides dynamic control over speculation in order to exploit ILP when the behavior of the loop will allow it. If the compiler mis-predicts or if the first few iterations are not representative of the entire loop behavior, then this mechanism protects processor 100 from incurring too many mis-speculations while at the same time turning speculation on for what would otherwise be missed opportunities.

Figure 2A:
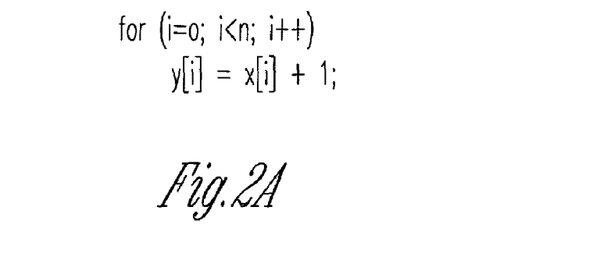
FIGS. 2A and 2B show a software loop that includes instruction-level parallelism.
Figure 2B:
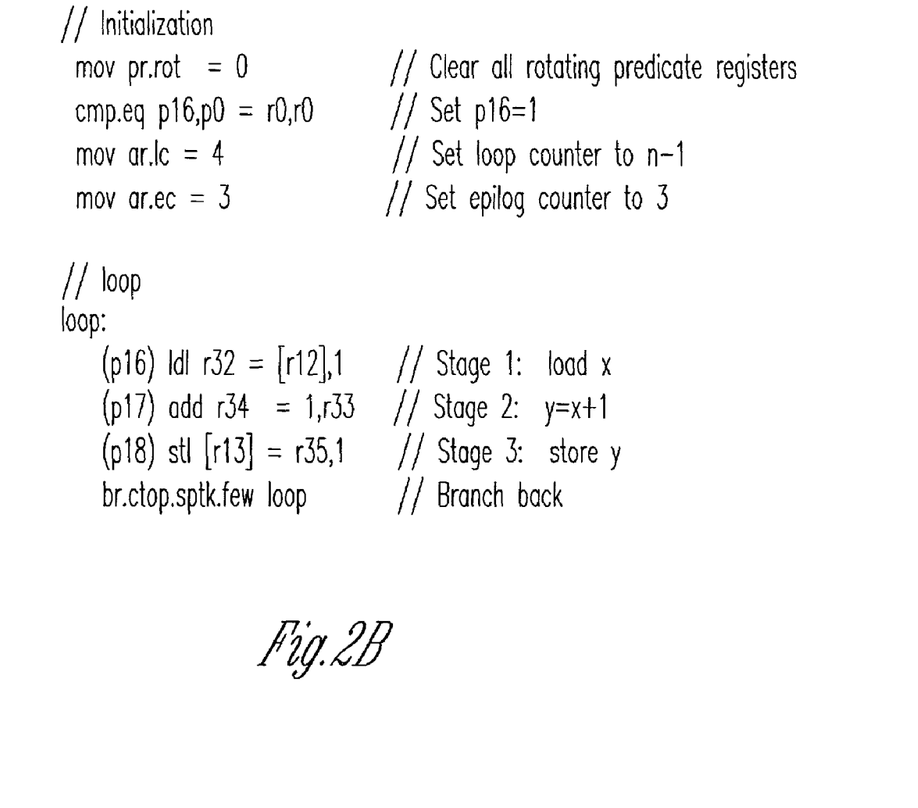

FIGS. 2A and 2B show a software loop that includes instruction-level parallelism. FIG. 2A shows a C-language code example of a very tight loop. The assignment statement is executed "n" times, and for each execution, a different "x" array element and a different "y" array element are accessed.

Figure 3:
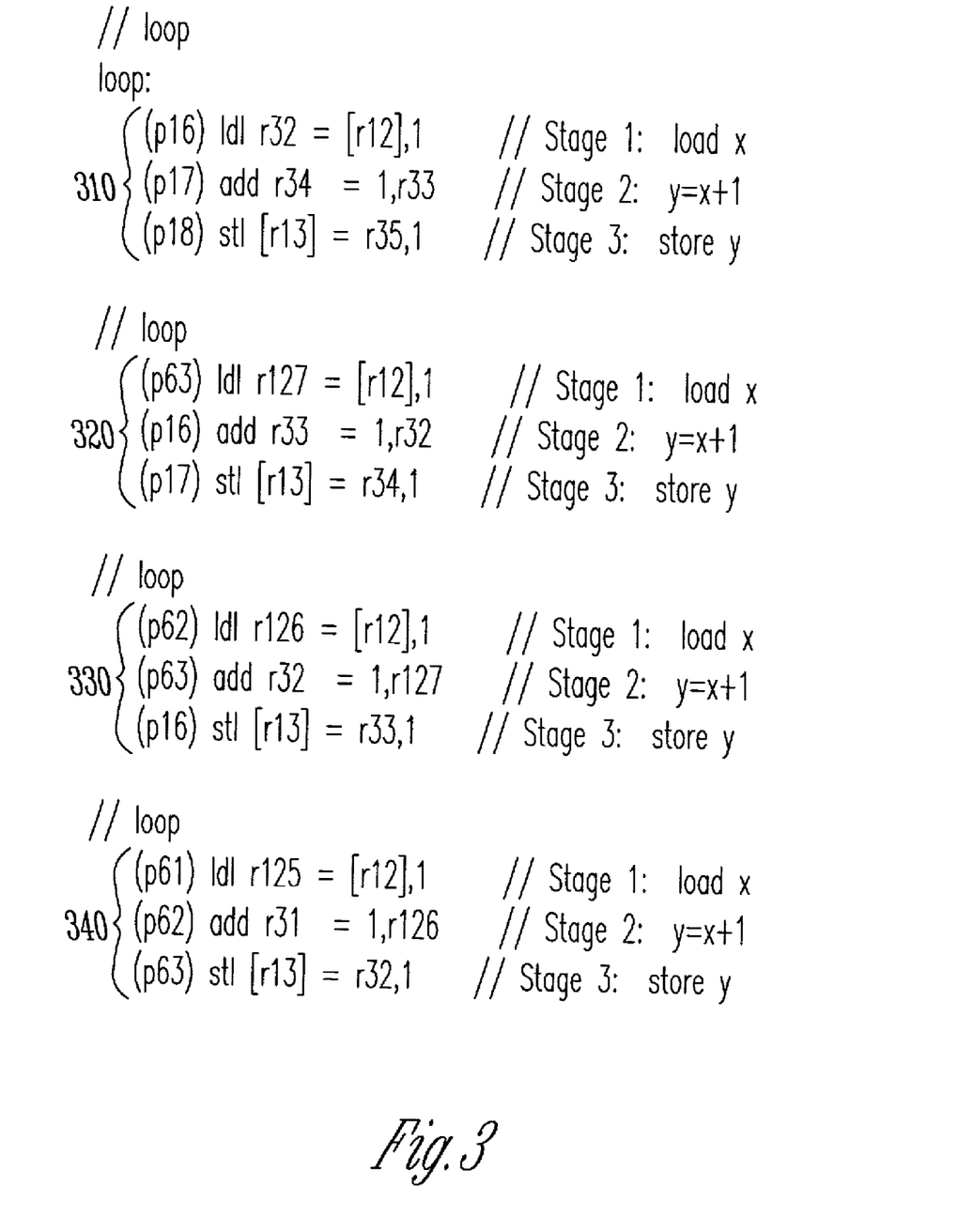
FIG. 3 shows instructions with registers renamed using register rotation prediction.

FIG. 2B shows a software pipelined assembly language version of the same software loop using an exemplary processor instruction set. One skilled in the art will understand that the techniques illustrated with respect to FIG. 2B are not limited to the instruction set presented, but are widely applicable to processor instruction sets in general. The first four instructions outside the loop body are used to set up loop counter and epilog registers and to initialize the predicate registers used to stage the software pipeline. Within the loop body, each of rotating predicate registers "p16," p17," and "p18" is used to control one particular stage of the software pipeline. The rotating general purpose virtual registers "r32," r33," and "r34" are used for loop variant variables that are processed at different stages of the software pipeline. The non-rotating general purpose registers "r12" and "r13" are used to hold loop invariant variables. The "1d1" and "st1" instructions used inside the loop body are post-increment load and store instructions, respectively. FIG. 3 shows instructions with registers renamed using register rotation prediction and precomputation. Shown in FIG. 3 are four iterations of the assembly language loop of FIG. 2B. In the embodiment of FIG. 3, iterations 310, 320, 330, and 340 each have physical register addresses assigned. When these instructions are included in software pipeline instruction buffer 110 (FIG. 1), unarchitected frame marker registers are not needed to map virtual registers to physical registers. In other embodiments, virtual registers are specified in the loop iterations and physical register addresses are calculated using unarchitected frame marker registers.

The predicate registers upon which the instructions are predicated are unarchitected predicate registers 112 (FIG. 1). If a data dependence is later found, any of the instructions shown in FIG. 3 can be squashed by resetting the appropriate predicate register.

Figure 4:
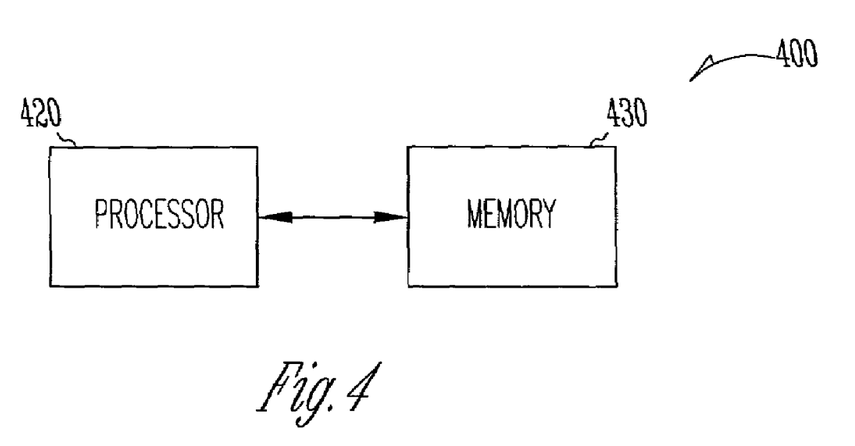
FIG. 4 shows a processing system.

FIG. 4 shows a processing system. Processing system 400 includes processor 420 and memory 430. In some embodiments, processor 420 is a processor capable of register rotation prediction and precomputation such as processor 100 (FIG. 1). In some embodiments, processor 420 and memory 430 are each separate integrated circuits. In some of these embodiments, processor 420 and memory 430 are arranged in a multi-chip module (MCM). In other embodiments, all of processing system 400 is implemented as a single integrated circuit. Processing system 400 can be a personal computer (PC), server, mainframe, handheld device, portable computer, set-top box, or any other system that includes software.

Memory 430 represents an article that includes a machine readable medium. For example, memory 430 represents any one or more of the following: a hard disk, a floppy disk, random access memory (RAM), read only memory (ROM), flash memory, CDROM, or any other type of article that includes a medium readable by a machine. Memory 430 can store instructions for performing the execution of the various method embodiments of the present invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A processor comprising:
an execution pipeline having a register renaming stage to rotate registers in software pipelined loops;
a register rotation prediction unit connected to the register renaming stage to predict register addresses for future loop iterations;
a software pipeline instruction buffer to hold buffered instructions with predicted register addresses; and
unarchitected predicate registers connected to the execution pipeline and register prediction unit and operable to predicate the buffered instructions.

2. The processor of claim 1 further comprising speculation decision making hardware connected to the register rotation prediction unit to compute values for the plurality of unarchitected frame marker registers.

3. The processor of claim 2 further comprising register renaming hardware in a pipeline, the register renaming hardware being responsive to the plurality of unarchitected frame marker registers.

4. A processor comprising:
an execution pipeline having a register renaming stage to rotate registers in software pipelined loops;
a register rotation prediction unit connected to the register renaming stage to predict register addresses for future loop iterations;
a buffer to hold buffered instructions with predicted register addresses; and
the predicted register addresses allow the buffered instructions to be issued simultaneously with a branch instruction.

5. The processor of claim 4 further including a trace cache configured to hold prediction hint information for each trace.

6. The processor of claim 5 further comprising a trace cache fill unit to apply register rotation prediction to traces as traces are constructed.

7. A processor comprising:
an execution pipeline having a register renaming stage to rotate registers in software pipelined loops;
a register rotation prediction unit to predict register addresses for future loop iterations; and
a hint register to encode prediction hints for the register rotation prediction unit.

8. The processor of claim 7 wherein the hint register is configured to hold static hints generated by a compiler.

9. The processor of claim 7 wherein the hint register is configured to hold dynamic hints generated at runtime.

10. The processor of claim 7 wherein the hint register is configured to hold an iteration distance.

11. The processor of claim 7 further comprising a trace cache.

12. The processor of claim 7 wherein the trace is configured to hold a prediction hint information for each trace.

13. The processor of claim 12 further comprising a trace cache fill unit to apply register rotation prediction to traces as traces are constructed.

14. A processor comprising:
an execution pipeline having a register renaming stage to rotate registers in software pipelined loops;
a register rotation prediction unit connected to the register renaming stage to predict register addresses for future loop iterations; and
a plurality of unarchitected frame marker registers connected to the execution pipeline and the register rotation prediction unit.

15. The processor of claim 14 wherein the register rotation prediction unit comprises speculation decision making hardware to compute values for the plurality of unarchitected frame marker registers.

16. The processor of claim 15 further comprising register renaming hardware in a pipeline, the register renaming hardware being responsive to the plurality of unarchitected frame marker registers.

17. A processing system comprising:
an execution pipeline;
cache memory coupled to the execution pipeline to hold processor instructions arranged in a software loop;
register rotation prediction hardware to predict physical register values for the processor instructions in future iterations of the software loop;
a software pipeline instruction buffer coupled between the execution pipeline and the register rotation prediction hardware to hold the processor instructions in future iterations of the software loop; and
at least one unarchitected frame marker register coupled to the register rotation prediction hardware to hold predicted register offsets for future iterations.

18. The processing system of claim 17 wherein the execution pipeline includes register renaming logic responsive to the at least one unarchitected frame marker register.

19. The processing system of claim 17 further comprises speculation decision making hardware connected to the register rotation prediction unit to compute values for the at least one unarchitected frame marker register.

20. A processing system comprising:
an execution pipeline;
cache memory coupled to the execution pipeline to hold processor instructions arranged in a software loop;
register rotation prediction hardware to predict physical register values for the processor instructions in future iterations of the software loop;
a software pipeline instruction buffer coupled between the execution pipeline and the register rotation prediction hardware to hold the processor instructions in future iterations of the software loop; and
the register rotation prediction hardware includes a circuit to specify complete physical register addresses for the processor instructions in future iterations of the software loop.

21. The processing system of claim 20 wherein processor instructions held in the software pipeline instruction buffer include fully specified physical register addresses.

22. The processing system of claim 20 further comprising fully specified physical register addresses for the processor instructions held in the software pipeline instruction buffer.

23. A processing system comprising:
an execution pipeline;
cache memory coupled to the execution pipeline to hold processor instructions arranged in a software loop;
register rotation prediction hardware to predict physical register values for the processor instructions in future iterations of the software loop;
a software pipeline instruction buffer coupled between the execution pipeline and the register rotation prediction hardware to hold the processor instructions in future iterations of the software loop; and
the execution pipeline is configured to speculatively execute instructions received from the software pipeline instruction buffer.

24. The processing system of claim 23 further comprising a plurality of unarchitected predicate registers, wherein the instructions within the software pipeline instruction buffer are predicated on at least one of the plurality of unarchitected predicate registers.

25. The processing system of claim 23 further comprising a hint register to encode prediction hints for the register rotation prediction hardware.

26. A method of executing a software pipelined loop comprising:
rotating registers for each iteration of the loop;
predicting register rotations for future iterations of the loop;
the software pipelined loop comprises at least one branch instruction, the method further comprising issuing at least one non-branch instruction simultaneously with the at least one branch instruction; and
the at least one non-branch instruction is predicated on an unarchitected predicate register.

27. The method of claim 26 further including generating static hints for the predicting of register rotations.

28. The method of claim 26 further including generating dynamic hints at runtime for the predicting of register rotations.

29. A method of executing a software pipelined loop comprising:
rotating registers for each iteration of the loop;
predicting register rotations for future iterations of the loop;
the software pipelined loop comprises at least one branch instruction, the method further comprising issuing at least one non-branch instruction simultaneously with the at least one branch instruction; and
speculatively removing stop bits from the at least one branch instruction.

30. The method of claim 29 further comprising speculatively executing the at least one non-branch instruction.

31. The method of claim 29 further including generating dynamic hints for the predicting of register rotations.

32. A method of executing a software pipelined loop comprising:
rotating registers for each iteration of the loop;
predicting register rotations for future iterations of the loop;
responsive to a hint register, predicting register rotations for more than one iteration in the future; and
modifying at least one unarchitected frame marker register.

33. The method of claim 32 further comprising:
speculatively executing instructions for the more than one iteration in the future; and
squashing the speculative execution if a data dependence between loop iterations occurs incorrectly.

34. The method of claim 33 further comprising modifying the hint register when speculative execution is squashed.

* * * * *

UNITED STATES PATENT AND TRADEMARK OFFICE
CERTIFICATE OF CORRECTION

| | | |
|---|---|---|
| PATENT NO. | : 7,051,193 B2 | Page 1 of 1 |
| APPLICATION NO. | : 09/819339 | |
| DATED | : May 23, 2006 | |
| INVENTOR(S) | : Wang et al. | |

It is certified that error appears in the above-identified patent and that said Letters Patent is hereby corrected as shown below:

column 9, line 7, in Claim 12, delete "claim7" and insert -- claim 11 --, therefor.

Signed and Sealed this

Twelfth Day of September, 2006

JON W. DUDAS
*Director of the United States Patent and Trademark Office*